United States Patent
Sharma et al.

(10) Patent No.: US 9,045,364 B2
(45) Date of Patent: Jun. 2, 2015

(54) SURFACE TREATMENT PROCESS FOR GLASS CONTAINERS

(71) Applicant: Owens-Brockway Glass Container Inc., Perrysburg, OH (US)

(72) Inventors: Pramod K Sharma, Ann Arbor, MI (US); Carol A Click, Corning, NY (US)

(73) Assignee: Owens-Brockway Glass Container Inc, Perrysburg, OH (US)

( * ) Notice: Subject to any disclaimer, the term of this patent is extended or adjusted under 35 U.S.C. 154(b) by 304 days.

(21) Appl. No.: 13/690,521

(22) Filed: Nov. 30, 2012

(65) Prior Publication Data
US 2014/0154438 A1     Jun. 5, 2014

(51) Int. Cl.
    *C03C 21/00*     (2006.01)
(52) U.S. Cl.
    CPC ........... *C03C 21/002* (2013.01); *Y10T 428/131* (2015.01)
(58) Field of Classification Search
    CPC ...... C03C 21/00; C03C 21/001; C03C 21/002
    USPC ....................................................... 65/30.14
    See application file for complete search history.

(56) References Cited

U.S. PATENT DOCUMENTS

| | | | | |
|---|---|---|---|---|
| 2,198,733 A | * | 4/1940 | Leibig et al. | 205/769 |
| 3,486,995 A | * | 12/1969 | Evers | 205/769 |
| 3,632,321 A | * | 1/1972 | Plumat et al. | 204/515 |
| 3,773,488 A | * | 11/1973 | Tran et al. | 65/30.14 |
| 3,798,013 A | | 3/1974 | Inoue et al. | |
| 3,844,754 A | | 10/1974 | Grubb et al. | |
| 4,206,253 A | | 6/1980 | Watanabe | |
| 4,434,191 A | | 2/1984 | Cook et al. | |
| 4,702,760 A | * | 10/1987 | Garcia de Leon | 65/30.14 |
| 4,872,896 A | | 10/1989 | LaCourse et al. | |
| 4,883,523 A | * | 11/1989 | Lee et al. | 65/30.14 |

FOREIGN PATENT DOCUMENTS

DE        121097        7/1976

OTHER PUBLICATIONS

PCT International Search Report and Written Opinion, Int Serial No. PCT/US2013/069599, Int Filing Date: Nov. 12, 2013, Applicant: Owens-Brockway Glass Container Inc., Mail Date: Mar. 12, 2014.

\* cited by examiner

*Primary Examiner* — Joseph S Del Sole
*Assistant Examiner* — Cynthia Szewczyk

(57) ABSTRACT

A glass container and a process for chemically modifying a surface portion of a glass container using an ion-exchange process. At least a portion of the glass container is immersed in or in contact with an aqueous electrolyte solution comprising salts of at least one group IA alkali metal and having a temperature of about 75 degrees Celsius such that exchangeable alkali metal ions in a surface portion of the glass container are exchanged or replaced by alkali metal ions in the electrolyte solution. The alkali metal ions that replace the exchangeable ions in the surface portion of the glass container have either a smaller or a larger atomic radius than the exchangeable ions.

17 Claims, 2 Drawing Sheets

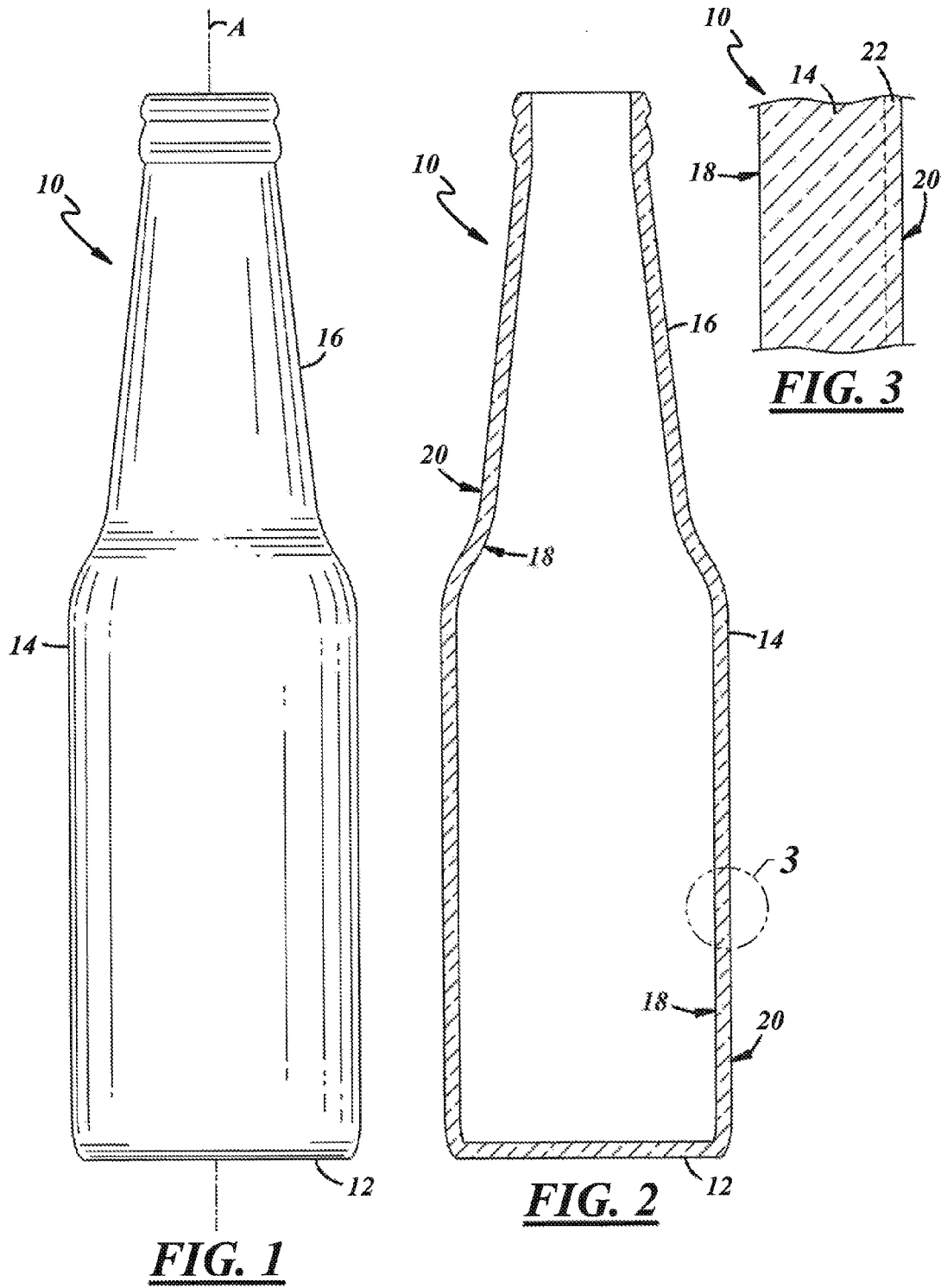

SURFACE TREATMENT PROCESS FOR GLASS CONTAINERS

The present disclosure relates to a process for treating surfaces of glass containers using an ion-exchange process.

BACKGROUND AND SUMMARY OF THE DISCLOSURE

Various ion-exchange processes have been developed to modify glass surfaces. For example, U.S. Pat. No. 3,844,754 discloses a process for strengthening a glass article by forming a solid layer of an alkali metal salt on a surface of the glass, and then heating the glass article and the solid layer at an elevated temperature to carry out an exchange of ions. The alkali metal salt must contain an alkali metal carbonate, and the glass article may be heated to a suitably elevated temperature by passing the glass article through an annealing lehr.

A general object, in accordance with one aspect of the disclosure, is to provide a surface treatment process for reducing light reflection from a glass container, without reducing light transmission through the glass container (i.e., without reducing the clarity of the container). A general object, in accordance with another aspect of the disclosure, is to provide a surface treatment process for strengthening a glass container. A general object, in accordance with yet another aspect of the disclosure, is to provide a surface treatment process for a glass container, which can be used to prepare the glass container for the subsequent application of one or more cold-end coatings.

The present disclosure embodies a number of aspects that can be implemented separately from or in combination with each other.

In accordance with an aspect of the disclosure, there is provided a surface treatment process for a glass container comprising: contacting at least a portion of the glass container with an aqueous electrolyte solution, and then heating the glass container with the aqueous electrolyte solution to a temperature between 70 degrees Celsius and 100 degrees Celsius for a time sufficient to exchange alkali metal ions in a surface portion of the glass container with alkali metal ions in the electrolyte solution. The aqueous electrolyte solution comprises salts of at least one group IA alkali metal and has a salt mass fraction in the range of 10-50%.

In accordance with another aspect of the disclosure, there is provided a process for producing a soda-lime-silica glass container including the steps of: (a) forming the glass container; (b) annealing the glass container; (c) immersing at least a portion of the glass container in an aqueous electrolyte solution containing salts of a group IA alkali metal; and then (d) applying a cold-end coating to an exterior surface of the glass container. The aqueous electrolyte solution has a temperature between 70 degrees Celsius and 100 degrees Celsius and a salt mass fraction in the range of 10-50%. The glass container is immersed in the aqueous electrolyte solution to exchange ions in a surface portion of the glass container with at least a portion of the alkali metal ions in the electrolyte solution.

In accordance with yet another aspect of the disclosure, there is provided a surface treatment process for a silica-based glass container which comprises exchangeable metal ions of at least one of sodium ($Na^+$) and calcium ($Ca^{2+}$). The surface treatment process includes: contacting at least a portion of the glass container with an aqueous electrolyte solution comprising group IA alkali metal ions for a time sufficient to exchange at least a portion of the exchangeable metal ions in the silica-based glass container with at least a portion of the group IA alkali metal ions in the aqueous electrolyte solution. The aqueous electrolyte solution has a temperature between 70 degrees Celsius and 100 degrees Celsius and comprises group IA alkali metal ions that have ionic radii larger than that of sodium ($Na^+$) or calcium ($Ca^{2+}$) ions.

BRIEF DESCRIPTION OF THE DRAWING

The disclosure, together with additional objects, features, advantages and aspects thereof, will be best understood from the following description, the appended claims and the accompanying drawings, in which:

FIG. 1 is a side elevation of a glass container in accordance with an exemplary embodiment of the present disclosure;

FIG. 2 is a cross-sectional view of the glass container of FIG. 1;

FIG. 3 is an enlarged cross-sectional view of a portion of the glass container, taken from circle 3 of FIG. 2;

DETAILED DESCRIPTION OF PREFERRED EMBODIMENTS

Figure 4:
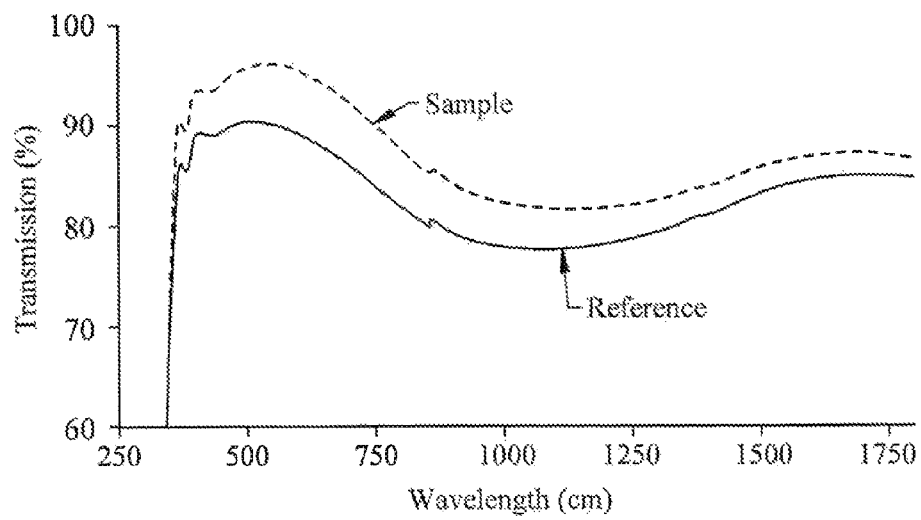
FIG. 4 illustrates plots of light transmission (%) as a function of wavelength (cm) for an untreated soda-lime-silica glass substrate (labeled as "Reference") and a soda-lime-silica glass substrate that has been treated by an exemplary embodiment of the presently disclosed ion-exchange process (labeled as "Sample")

FIG. 1 illustrates an exemplary embodiment of a glass container 10 that may be produced in accordance with a manufacturing process presently disclosed hereinbelow. The glass container 10 includes a base wall 12, a continuous sidewall 14 integrally formed with the base wall 12, and a neck 16 extending from the sidewall 14. As shown in FIG. 2, the glass container 10 is hollow and has an interior surface 18 and an exterior surface 20. A suitable thickness for the base wall 12, sidewall 14, and/or neck 16 of the glass container 12 (measured from the interior surface 18 to the exterior surface 20, or vice versa) is in the range of 1-5 mm.

FIG. 3 is an enlarged cross-sectional view of a portion of the sidewall 14 of the glass container 10, and illustrates that a surface portion 22 of the glass container 10 has been chemically modified by an ion-exchange process wherein exchangeable alkali metal ions in the surface portion 22 are exchanged or replaced by alkali metal ions having smaller or larger ionic radii. By modifying the surface portion 22 of the glass container 10 in this way, the surface roughness of the glass container 10 is increased and the total light reflected from the glass container 10 is reduced. In addition, when the exchangeable alkali metal ions in the surface portion 22 are exchanged or replaced by alkali metal ions having larger ionic radii, a compressive stress layer is formed in the surface portion 22 of the glass container 10, which improves the overall strength of the glass container.

In the exemplary embodiment shown in FIG. 3, the chemically modified surface portion 22 extends from the exterior surface 20 of the glass container 10. But, in other embodiments, the interior surface 18 of the glass container 10, or both the interior and exterior surfaces 18, 20 of the glass container 10, may be chemically modified by the presently disclosed ion-exchange process.

The glass container is preferably made of an inorganic silica-based glass, such as soda-lime-silica glass, borosilicate glass, or aluminosilicate glass.

A presently preferred soda-lime-silica glass composition may comprise the following materials in the following ranges of amounts by weight:

| | |
|---|---|
| 60-75% | $SiO_2$ |
| 7-15% | $Na_2O$ |
| 6-12% | $CaO$ |
| 0.1-3% | $Al_2O_3$ |
| 0-2% | $MgO$ |
| 0-2% | $K_2O$. |

A presently preferred borosilicate glass composition may comprise the following materials in the following ranges of amounts by weight:

| | |
|---|---|
| 70-85% | $SiO_2$ |
| 8-15% | $B_2O_3$ |
| 3-5% | $Na_2O$ |
| 2-4% | $Al_2O_3$ |
| 0-1% | $K_2O$. |

A presently preferred aluminosilicate glass composition may comprise the following materials in the following ranges of amounts by weight:

| | |
|---|---|
| 50-65% | $SiO_2$ |
| 20-40% | $Al_2O_3$ |
| 7-12% | $MgO$ |
| 5-10% | $CaO$ |
| 3-4% | $B_2O_3$ |
| 0-1% | $Na_2O$. |

The glass container also may include other materials in relatively small amounts. For example, the glass container may include small amounts of $TiO_2$, $Fe_2O_3$, or the like. Such materials may be additives and/or impurities in the raw materials used to produce the glass container. Such materials may be present in the glass container in trace amounts, for example, the mass fraction of other materials in the glass container may be less than 0.2%.

The glass container may be produced by any suitable method. For example, the glass container may be produced in a continuously operated glass manufacturing facility, which typically includes a glass furnace having an upstream end where raw materials are introduced, and a downstream end from which molten glass is distributed. Exemplary conditions and procedures for composing and melting production container glass can be found in, for example, *The Handbook of Glass Manufacture* by Fay V. Tooley (3rd ed., Ashlee Publishing 1984).

In a conventional container glass manufacturing facility, molten glass is channeled from the glass furnace through one or more forehearths to a plurality of forming machines, which shear off weighed "gobs" of molten glass. The glass gobs are loaded into forming machines, known as individual sections, where they are molded as per the desired container design. Thereafter, the glass containers are passed through an annealing lehr where they are reheated and slowly cooled according to a predetermined temperature profile to remove stress points and to prevent the glass containers from becoming brittle.

The upstream portions of a container glass manufacturing process (e.g., the glass melting, forming, and annealing processes) are typically referred to as "hot-end" processes, while the downstream portions (e.g., the glass container inspection, labeling, and packaging processes) are typically referred to as "cold-end" processes. Conventionally, a coating of tin oxide ($SnO_2$) or titanium dioxide ($TiO_2$) is applied to newly formed glass containers before they are passed through the annealing lehr, and this coating is commonly referred to as a "hot-end coating." Such hot-end coatings are generally designed to protect the surfaces of the glass containers from damage and to prepare the containers for the subsequent application of one or more "cold-end coatings," which are typically applied to the glass containers after they exit the annealing lehr. Cold-end coatings are designed to protect the surfaces of the glass containers from damage, and to prevent the containers from sticking together while they are transported on a conveyor.

According to embodiments of the present disclosure, one or more surfaces of a newly formed and annealed glass container are chemically modified by an ion-exchange process before the glass container is coated with a cold-end coating. The presently disclosed surface treatment process increases the surface roughness of the glass container, and thus suitably prepares the glass container for the subsequent application of a cold-end coating. Accordingly, the presently disclosed surface treatment process may be performed on uncoated glass containers to prepare the containers for application of one or more cold-end coatings. In such case, the application of a tin oxide ($SnO_2$) or titanium dioxide ($TiO_2$) hot-end coating may not be necessary.

The presently disclosed surface treatment process includes immersing at least a portion of the glass container in an aqueous electrolyte solution such that exchangeable ions in a surface portion of the glass container are exchanged with, or replaced by, alkali metal ions in the electrolyte solution.

A suitable aqueous electrolyte solution comprises salts of at least one group IA alkali metal. For example, the electrolyte solution may comprise chlorides, nitrates, sulfates and/or carbonates of lithium (Li), sodium (Na), and/or potassium (K). The mass fraction of alkali metal salts in the electrolyte solution may be about 30%. For example, the mass fraction of alkali metal salts in the electrolyte solution may range from 10-50%. The exchangeable metal ions in the surface portion of the glass container may include sodium ions ($Na^+$) and/or the calcium ions ($Ca^{2+}$). And, during the immersion process, some of the sodium ions (Na) and/or the calcium ions ($Ca^{2+}$) in the surface portion of the glass container are exchanged or replaced by some of the lithium ($Li^+$), sodium ($Na^+$), and/or potassium ($K^+$) ions in the electrolyte solution.

The glass container may be immersed in a suitably heated electrolyte solution for a sufficient amount of time to form an ion-exchanged or treated surface portion that extends from the internal surface or the external surface of the glass container to a depth of about 50 μm. For example, the ion-exchange process may be performed such that a treated surface portion is formed which extends from the internal or external surface of the glass container to a depth in the range of 1-100 μm. A suitably heated electrolyte solution may have a temperature of about 75 degrees Celsius. For example, the temperature of the electrolyte solution may be maintained at between 70 degrees Celsius and 100 degrees Celsius during the ion-exchange process. The glass container may be immersed in the suitably heated electrolyte solution for about 24 hours. For example, the glass container may be immersed in the electrolyte solution for a period of between 10 hours and 30 hours to form a suitably deep ion-exchanged or treated surface portion.

The entire glass container, or only a portion thereof, may be immersed in the electrolyte solution during the ion-exchange process. In one embodiment, the glass container is immersed in the electrolyte solution such that either the external surface or the internal surface of the glass container is in contact with the electrolyte solution. In another embodiment, the glass container is immersed in the electrolyte solution such that both the external and internal surfaces of the glass container are in contact with the electrolyte solution. In yet another embodiment, a mask is placed over the glass container such that only certain portions of the glass container surfaces are in contact with the electrolyte solution.

The surface treatment process of the present disclosure may further include removing the glass container from the electrolyte solution and washing or rinsing the glass container with a liquid (e.g., water) to remove any residual electrolyte solution from the treated surface or surfaces. Washing is suitably performed after the glass container has cooled to room temperature (e.g., between 20 degrees Celsius and 30 degrees Celsius). The liquid used to wash the glass container may be at a temperature of between 20 degrees Celsius and 100 degrees Celsius.

After the glass containers have been treated by the presently disclosed ion-exchange process, the one or more cold-end coatings may be applied thereto. Suitable cold-end coatings include polyethylene, stearate, and/or oleic acid coatings.

The treated glass containers may be inspected for any suitable characteristics and in any suitable manner. For example, the glass containers may be manually or automatically inspected for cracks, inclusions, surface irregularities, and/or the like. After inspection, the treated glass containers may be labeled and/or packaged in any suitable manner.

The manufacturing process may or may not include all of the steps disclosed herein, and the disclosed steps may or may not be performed in the sequence as set forth above.

The present disclosure may provide one or more advancements in the art. For example, the presently disclosed surface treatment process may be used to reduce the total light reflection of a soda-lime glass container. As another example, the presently disclosed surface treatment process may be used to increase light transmission through the glass container. As yet another example, the presently disclosed surface treatment process may be used to improve the mechanical strength of the glass container.

Various silica-based coatings are available for reducing light reflection from surfaces of soda-lime glass containers. However, commercially available silica-based coatings are expensive and must be cured after they are uniformly applied to the glass containers, for example, by heating the coated glass containers in a high temperature furnace or by exposing the glass containers to ultraviolet (UV) light, to produce a solid, functional coating. Such processes consume high amounts of energy, take a long time to complete, and increase production cost. But the presently disclosed surface treatment process can be performed in a single step at a relatively low temperature, without the need for expensive coating materials. Therefore, the presently disclosed surface treatment process provides a simple solution to a known problem in the art of glass container manufacturing.

EXAMPLES

Figure 5:
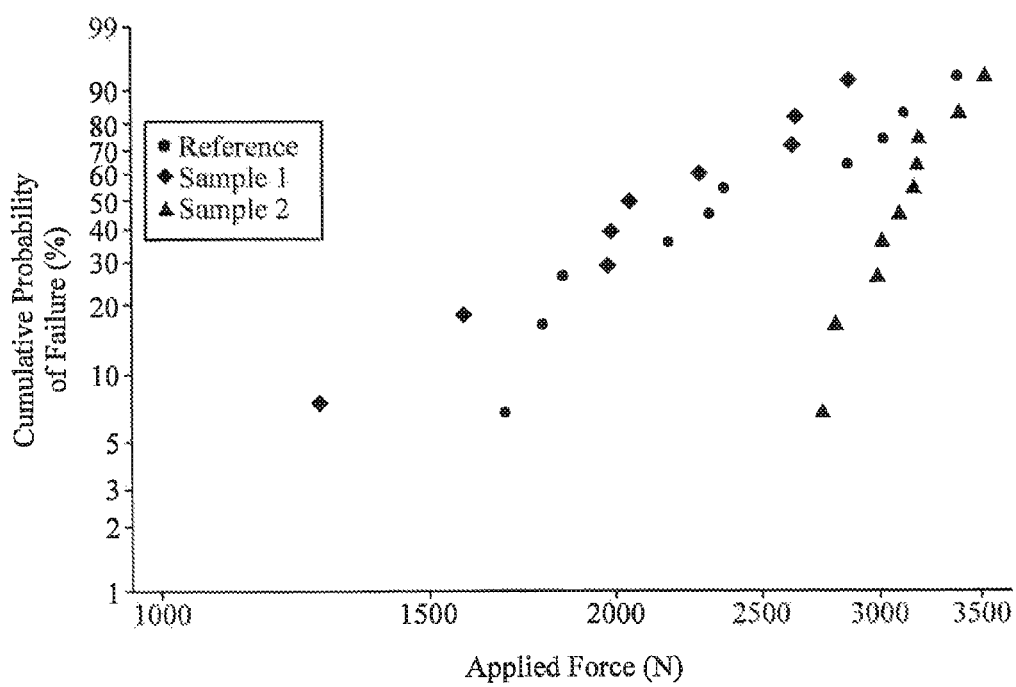
FIG. 5 illustrates Weibull plots of cumulative failure probability (%) vs. applied force (N) for an untreated soda-lime-silica glass substrate (labeled as "Reference") and two soda-lime-silica glass substrates that have been treated by exemplary embodiments of the presently disclosed ion-exchange process (labeled as "Sample 1" and "Sample 2").

Several 2'×2' soda-lime glass substrates having thicknesses of 3.2 mm were treated using exemplary electrolyte formulations. Thereafter, light transmission, as well as strength, of each treated glass substrate was measured. Untreated soda-lime glass substrates transmit 90.22% of incident light at 550 nm and transmit, on average, 82.96% of incident light at wavelengths between 400 nm and 1250 nm. A plot of light transmission (%) as a function of wavelength (cm) for an untreated soda-lime glass substrate (labeled as "Reference") is shown in FIG. 4 (labeled as "Reference"), and a Weibull plot of cumulative failure probability (%) vs. applied force (N) for an untreated soda-lime glass substrate is shown in FIG. 5 using circle-shaped data markers (also labeled as "Reference").

Example 1

An exemplary electrolyte solution according to another embodiment of the present disclosure was prepared by dissolving 200 g of lithium chloride (LiCl) and 100 g of potassium nitrate ($KNO_3$) in 700 mL of de-ionized water. A 2'×2' glass substrate was immersed in the electrolyte solution, and then the solution was heated to a temperature of about 75 degrees Celsius. After 24 hours, the glass substrate was removed from the electrolyte solution, washed or rinsed with de-ionized water, and dried in air for 15 minutes. Thereafter, light transmission through the treated glass substrate was measured using a PerkinElmer Lambda 900 UV/VIS/NIR Spectrometer. In addition, the strength of the treated glass substrate was assessed by performing ring-on-ring tests using an electromechanical Universal Testing Machine AGS-X-5kN by Shimadzu.

A glass substrate treated by the process of Example 1 transmits 90.34% of incident light at 550 nm and transmits, on average, 83.13% of incident light at wavelengths between 400 nm and 1250 nm. Therefore, the binary (LiCl—$KNO_3$) electrolyte solution of Example 1 can suitably be used to increase the amount of light transmitted through a soda-lime glass substrate by 0.17%.

A Weibull plot of cumulative failure probability (%) vs. applied force (N) for a soda-lime glass substrate treated by the process of Example 1 is shown in FIG. 5 using diamond-shaped data markers (labeled as "Sample 1"). The Weibull plot indicates that the binary (LiCl—$KNO_3$) electrolyte solution of Example 1 does not appreciably affect the strength of a soda-lime glass substrate.

Example 2

An exemplary electrolyte solution according to yet another embodiment of the present disclosure was prepared by dissolving 200 g of potassium nitrate ($KNO_3$) and 100 g of potassium chloride (KCl) in 700 mL of de-ionized water. A 2'×2' glass substrate was immersed in the electrolyte solution, and then the solution was heated to a temperature of about 75 degrees Celsius. After 24 hours, the glass substrate was removed from the electrolyte solution, washed or rinsed with de-ionized water, and dried in air for 15 minutes. Thereafter, light transmission through the as-treated glass substrate was measured using a PerkinElmer Lambda 900 UV/VIS/NIR Spectrometer. In addition, the strength of the treated glass substrate was assessed by performing ring-on-ring tests using an electromechanical Universal Testing Machine AGS-X-5kN by Shimadzu.

A plot of light transmission (%) as a function of wavelength (cm) for a soda-lime glass substrate treated by the process of Example 2 is shown in FIG. 4 (labeled as "Sample"). A glass substrate treated by this process transmits 96.11% of incident light at 550 nm and transmits, on average, 87.91% of incident light at wavelengths between 400 nm and 1250 nm. Therefore, the binary ($KNO_3$—KCl) electrolyte solution of Example 2 can suitably be used to increase the total light transmission through a soda-lime glass substrate by 4.94%. In addition, by comparison to Example 1, this Example indicates that a greater increase in light transmission through a soda-lime glass substrate can be achieved by using an electrolyte solution that contains alkali metal ions of potassium ($K^{+1}$), opposed to an electrolyte solution that contains alkali metal ions of potassium ($K^{+1}$) and lithium ($Li^{+1}$).

A Weibull plot of cumulative failure probability (%) vs. applied force (N) for a soda-lime glass substrate treated by the process of Example 2 is shown in FIG. 5 using triangle-shaped data markers (labeled as "Sample 2"). The Weibull plot indicates that the binary ($KNO_3$—KCl) electrolyte solution of Example 2 can be used to increase the strength of soda-lime glass substrates.

The thermal stability of a soda-lime glass substrate treated by the process of Example 2 was tested by heating the substrate to a temperature of 490 degrees Celsius for 2.5 hours. Thereafter, light transmission through the glass substrate was measured again. A heat-treated soda-lime glass substrate also treated by the process of Example 2 transmits 96.33% of incident light at 550 nm and transmits, on average, 87.33% of incident light at wavelengths between 400 nm and 1250 nm. Accordingly, the antireflection properties imparted to a glass substrate by the process of Example 2 are thermally stable.

There thus has been disclosed a surface treatment process for a glass container that at least partially satisfies one or more of the objects and aims previously set forth. The disclosure has been presented in conjunction with several exemplary embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A surface treatment process for a glass container comprising:
   contacting at least a portion of the glass container with an aqueous electrolyte solution comprising salts of at least one group IA alkali metal, the aqueous electrolyte solution having a salt mass fraction in the range of 10-50%; and then
   heating the glass container with the aqueous electrolyte solution to a temperature between 70 degrees Celsius and 100 degrees Celsius for a time sufficient to exchange alkali metal ions in a surface portion of the glass container with alkali metal ions in the electrolyte solution.

2. A process as set forth in claim 1 further comprising:
   removing the glass container from the aqueous electrolyte solution; and then
   rinsing the glass container with a liquid to remove any residual salts therefrom.

3. A process as set forth in claim 1 wherein the glass container is heated with the aqueous electrolyte solution for 10 hours to 30 hours.

4. A process as set forth in claim 1 wherein the alkali metal ions in the electrolyte solution include lithium ($Li^+$), sodium ($Na^+$), potassium ($K^+$), or combinations thereof.

5. A process as set forth in claim 1 wherein the salts of at least one group IA alkali metal include lithium chloride (LiCl), lithium nitrate ($LiNO_3$), lithium sulfate ($Li_2SO_4$), lithium carbonate ($Li_2CO_3$), potassium chloride (KCl), potassium nitrate ($KNO_3$), potassium sulfate ($K_2SO_4$), potassium carbonate ($K_2CO_3$), or combinations thereof.

6. A process as set forth in claim 1, wherein the glass container is made of soda-lime-silica glass, borosilicate glass, or aluminosilicate glass.

7. A process as set forth in claim 6, wherein the glass container is heated with the aqueous electrolyte solution for a time sufficient to exchange sodium ions ($Na^+$) in a surface portion of the glass container with potassium ($K^+$) in the electrolyte solution.

8. A process for producing a soda-lime-silica glass container including the steps of:
   (a) forming the glass container;
   (b) annealing the glass container;
   (c) immersing at least a portion of the glass container in an aqueous electrolyte solution containing salts of a group IA alkali metal to exchange ions in a surface portion of the glass container with at least a portion of the alkali metal ions in the electrolyte solution, the aqueous electrolyte solution having a temperature between 70 degrees Celsius and 100 degrees Celsius and a salt mass fraction in the range of 10-50%; and then
   (d) applying a cold-end coating to an exterior surface of the glass container.

9. A process as set forth in claim 8, wherein the cold-end coating of step (d) is a polyethylene, stearate, or oleic acid coating.

10. A process as set forth in claim 8, wherein the glass container is immersed in the aqueous electrolyte solution of step (c) for 10 hours to 30 hours.

11. A process as set forth in claim 8, wherein the salts of the group IA alkali metal of step (c) include lithium chloride (LiCl), lithium nitrate ($LiNO_3$), lithium sulfate ($Li_2SO_4$), lithium carbonate ($Li_2CO_3$), potassium chloride (KCl), potassium nitrate ($KNO_3$), potassium sulfate ($K_2SO_4$), potassium carbonate ($K_2CO_3$), or combinations thereof.

12. A process as set forth in claim 8, wherein the group IA alkali metal of step (c) is lithium ($Li^+$), sodium ($Na^+$), or potassium ($K^+$).

13. A process as set forth in claim 8, wherein the soda-lime-silica glass container comprises: 60-75 wt % $SiO_2$, 7-15 wt % $Na_2O$, 6-12 wt % CaO, 0.1-3.0 wt % $Al_2O_3$, 0-2.0 wt % MgO, and 0-2.0 wt % $K_2O$.

14. A process as set forth in claim 13, wherein the glass container is immersed in the aqueous electrolyte solution of step (c) for a time sufficient to exchange sodium ions ($Na^+$) in a surface portion of the glass container with potassium ($K^+$) ions in the electrolyte solution.

15. A surface treatment process for a silica-based glass container which comprises exchangeable metal ions of at least one of sodium ($Na^+$) and calcium ($Ca^{2+}$), the surface treatment process including:
   contacting at least a portion of the glass container with an aqueous electrolyte solution having a temperature between 70 degrees Celsius and 100 degrees Celsius and comprising group IA alkali metal ions having ionic radii larger than that of sodium ($Na^+$) or calcium ($Ca^{2+}$); and
   maintaining contact between the glass container and the aqueous electrolyte solution for a time sufficient to exchange at least a portion of the exchangeable metal ions in the silica-based glass container with at least a portion of the group IA alkali metal ions in the aqueous electrolyte solution.

16. A process as set forth in claim 15, wherein the group IA alkali metal ions in the aqueous electrolyte solution are potassium ions ($K^{+1}$).

17. A process as set forth in claim 15, wherein the glass container is in contact with the aqueous electrolyte solution for a time sufficient to form a compressive stress layer in a surface portion of the glass container.

* * * * *